United States Patent Office 2,801,650
Patented Aug. 6, 1957

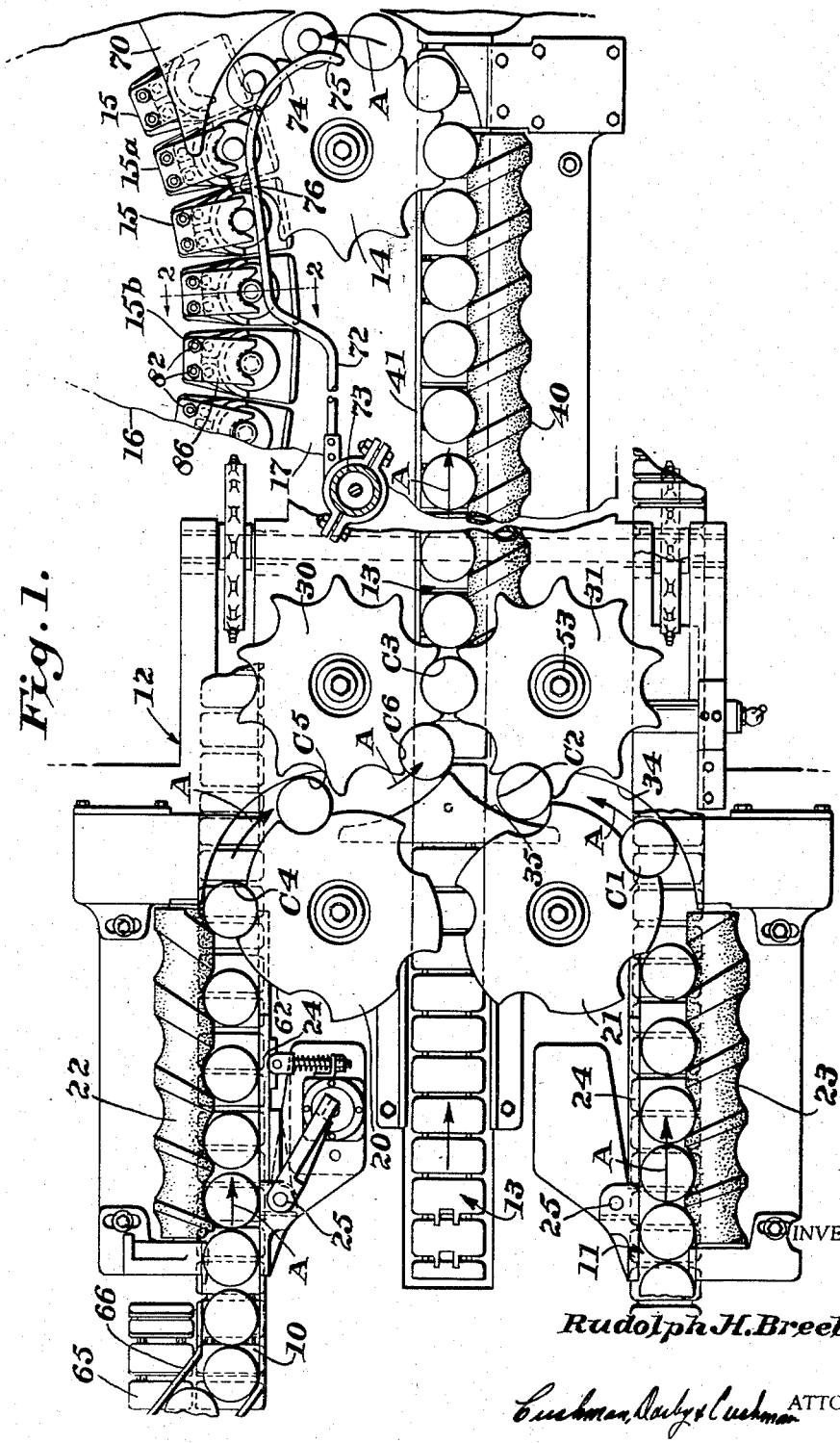

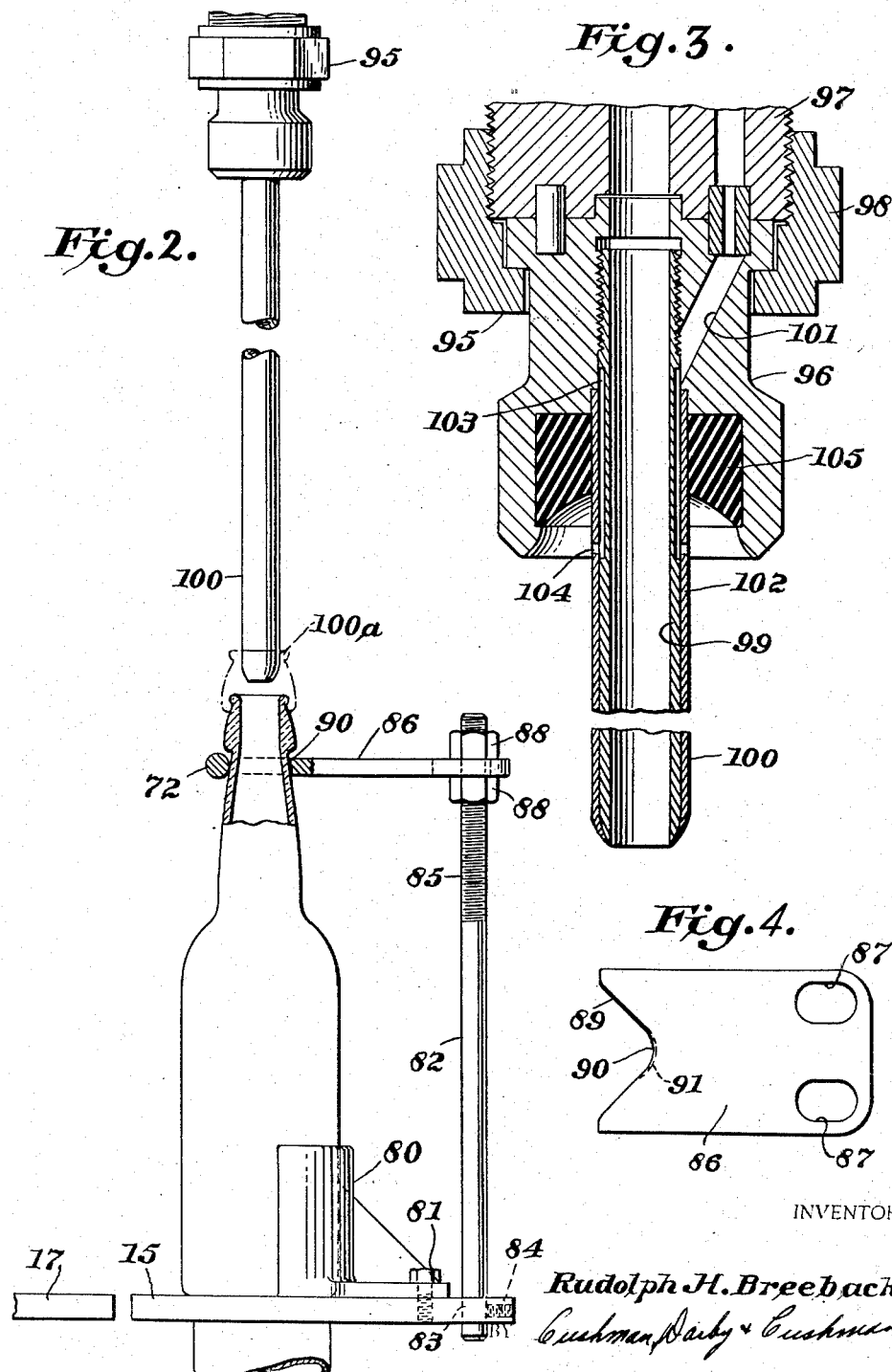

2,801,650

FILLING STRUCTURE

Rudolph H. Breeback, Baltimore, Md., assignor to Crown Cork & Seal Company, Inc., Baltimore, Md., a corporation of New York Original application December 23, 1953, Serial No. 399,998. Divided and this application December 28, 1954, Serial No. 478,079

7 Claims. (Cl. 141—1)

The present invention relates to a filling structure and more particularly, to a mechanism for moving containers to and positioning containers on filling machines. The invention also includes certain improvements in container supporting platforms of rotary filling tables.

The present application is a divisional application of my copending United States application Serial No. 399,998, filed December 23, 1953, and entitled "Container Feeding Mechanism."

The aforementioned copending application pertains to details of the mechanisms for feeding containers to and from filling machines. Therefore, it will suffice to say that the subject matter of the aforementioned application, which is not repeated herein, would be used with the present invention and to that extent would form a part of the present disclosure.

The feeding of bottles and cans smoothly between various machines in a bottling plant involves substantial difficulties, particularly if a single machine for performing one operation feeds containers to, or receives containers from, a plurality of machines for performing another operation. For example, if a filling machine is able to fill four hundred containers per minute, but it is necessary to deliver empty bottles thereto from two bottle washers or soakers, each with the capacity of two hundred bottles per minute, the two lines of bottles from the washers must be smoothly placed in a single line for delivery to the rotary filling table of the filling machine. The problem of thus combining lines of containers is tremendously increased when the merged line of containers must move at relatively high speed, for example, four hundred containers per minute. One aspect of the problem is that if the containers intermittently contact with each other while moving at such high speed, either cans or bottles may be upset and, if bottles are involved, they may be marred or abraded.

Although the problem discussed has been stated in terms of containers and the embodiment of the invention hereinafter described discloses a structure designed for handling beverage containers, it will be understood that the invention is entirely applicable to the handling of containers being filled with various commodities other than beverages.

An object of the present invention is to provide a structure for smoothly transferring articles with respect to two sets of conveying elements, one arranged to handle more articles per minute than the other and with a minimum possibility of the articles being marred, upset or jammed while they are being combined and transferred to a rotary filling machine.

Another object of the invention is to provide a mechanism for transferring articles from a plurality of low capacity conveying elements to a single high capacity conveying element.

Still another object of the invention is the provision of a transfer mechanism which is so designed that once articles have been placed in a desired relative arrangement, for example, spaced apart, they will be maintained in that arrangement.

Difficulties arise if operation of a beer filler is stopped for a few minutes, as may be necessary if the supply of containers is temporarily interrupted at the washer. In more detail, when operation is re-started, several of the first round of containers filled usually will foam to a slight extent and may have to be discarded. Such foaming usually is due to the fact that the small amount of beer which remains in each filling head during the stoppage becomes very slightly warmer than the beer in the reservoir. Therefore, when the small charge of warmer beer moves into the bottle, foaming is initiated and may continue while the remainder of the fill moves into the bottle.

One feature of the present invention resides in the fact that the container feeding mechanism is so synchronized with respect to the rotary filling table that the containers supplied to the rotary filling table by either container supply line always will be placed on the same filling platforms of the rotary table. For example, if two infeed conveyor means are used, the containers moving from one conveyor means will be placed on even numbered filling platforms and those from the other conveyor means always will be placed on the odd numbered platforms. If one conveyor means, for example, that which provides containers for the even numbered platforms, fails to receive containers from the bottle washer or other source of containers, the odd numbered platforms nevertheless will receive containers in regular order and therefore will continue to fill those containers in normal fashion. If the stoppage of containers to the even numbered platforms continues for a sufficient length of time that foaming may occur when feed of containers to those platforms is resumed, the operator need only check the containers on the even numbered platforms. In the meantime, as stated above, the containers received by the odd numbered platforms all will be filled without difficulty.

In comparison with the above-described regularity of action, it will be perceived that if a pair of conveyor means delivered containers at random, and if delivery by one conveyor means should be discontinued, some filling heads might produce a foam-fill over various lengths of time and every container would have to be carefully checked until after all conveyor means resume feed.

Another object of the invention is to provide a container feeding mechanism to deliver containers to a rotary filling table from two or more different sources and which mechanism is so synchronized with respect to the rotary table that containers moving from one source always will be delivered to the same series of platforms and filling heads of the rotary filling table.

Still another object of the invention is to provide a transfer mechanism for use with a rotary filling machine which is particularly effective in moving containers at high speed to a rotary filling table and without possibility of containers being upset.

Another object of the invention is to provide an improved form of container engaging and centering mechanism for use on the platforms of a rotary filling table.

Other objects and advantages of the invention will be apparent from the following description and accompanying drawings.

In the drawings:

Figure 1 is a plan view of one form of the invention with a portion of the length of one conveyor means broken away and with a modified arrangement indicated by dotted lines;

Figure 2 is a view on the line 2—2 of Figure 1 showing a container supporting platform and a portion of a filling head of a rotary filling machine in elevation;

Figure 3 is an axial section of the lower portion of a filling head; and

Figure 4 is a top plan view of a container centering plate.

Referring to Figure 1, the mechanism there illustrated includes two bottle or can conveying elements 10 and 11 forming part of a first conveyor means. The elements 10 and 11 are straight line endless link-type conveyors formed of flat plates and are suitably guided in the upper surface of a table structure 12. In the embodiment of the invention discussed below, each of the elements 10 and 11 would handle containers received through intermediate conveyors from a separate bottle washing or can rinsing apparatus.

A third bottle or can conveying element 13 included in a second conveyor means is of the same type as the elements 10 and 11 and extends beyond, parallel to and intermediate the conveying elements 10 and 11. In the arrangement under discussion, conveyor 13 is adapted to receive bottles or cans supplied by the conveying elements 10 and 11 of the first conveyor means. In Figure 1, the arrows A indicate the direction of travel of containers in the operation now under discussion. As shown by such arrows A, the conveying element 13 is arranged to deliver containers to the infeed dial 14 of a beverage filling machine and dial 14 then places the containers upon the usual vertically movable container supporting platforms 15 of the rotary filling table 16.

In accordance with usual practice, the rotary filling table 16 is journalled for rotation about a vertical axis fixed with respect to the filling machine base structure generally indicated by the numeral 17. Infeed dial 14 also is journalled for rotation in the base structure 17 and it will be understood that the right-hand portion of the conveying element 13 is suitably mounted in that base structure so that the upper run of element 13 will move across the top surface of the filling machine base structure or work table. In Figure 1, the left-hand portion of this table is broken away.

The conveying element 10 delivers containers to a pocketed dial 20 rotatable above the upper surface of table structure 12. The other conveying element 11 delivers containers to a similar dial 21 also journalled in the structure 12. Both conveying elements 10 and 11 will have suitable stationary guides extending along their length and, immediately in advance of the dials 20 and 21, the respective conveying elements have associated therewith container spacing devices 22 and 23. These devices may be of the construction disclosed in the application for Article Feeding Mechanism of Carl L. Day and Rudolph H. Breeback, filed June 6, 1951, Serial No. 230,192, now Patent No. 2,730,226, and are adapted to progressively space apart containers moving in contact therewith. That is, each of the devices 22 and 23 is of screw form and is rotated about a horizontal axis substantially parallel with the elements 10 and 11. For example, during movement of a container upon element 10 along feed screw 22, the helical groove in the screw will control the container so that it will be spaced a predetermined distance from the immediately following container. As is described in said Day and Breeback application, and as is illustrated with respect to the structure associated with feed screw 22, in order to hold containers in contact with the screws 22 and 23, and also to stop operation of at least the adjacent feed screw in the event a container becomes jammed with respect thereto, a pivoted guide plate 24 is provided on the opposite sides of the conveying elements 10 and 11 from each of the feed screws. Each pivoted plate 24 normally occupies a position such as indicated in Figure 1, but if a container becomes jammed with respect to a feed screw, the corresponding plate will swing away from the feed screw and about its pivot 25 to thereby operate a switch as described in said application to thereby stop movement of at least that feed screw.

As has been indicated above, the dials 20 and 21 receive containers from the conveying elements 10 and 11. Because the screw 22 and dial 20 are symmetrically out of phase with the screw 23 and dial 21, the dial 20 will receive a container at a time point which is midway between the time points when dial 21 receives two immediately successive containers. The dials 20 and 21 deliver containers to an additional pair of dials designated 30 and 31. It will be observed that the dials 20 and 21 are positioned on opposite sides of the center line of the conveying element 13 and the dials 30 and 31 are similarly positioned, the axes of the four dials being positioned at the corners of an imaginary rectangle. All four dials are of the same pitch diameter so that containers move about all of the dials on like radii. The dials 20 and 21 are shown provided with five equidistantly spaced pockets and, in such case, each of the dials 30 and 31 would be provided with ten pockets.

As will be clear from Figure 1, a container at position C1 in a pocket of the dial 21 and moving along stationary guide 34 will reach the position indicated at C2 where it will be under the control of dial 31 which will carry the container along a stationary guide 35 to position C3 where the container also will be engaged by a pocket of the dial 30.

While the dials 21 and 31 have been moving the container discussed immediately above, the dials 20 and 30 will be moving a container from position C4, through position C5 to position C6. It will be noted that the container at position C6 will be in the pocket of dial 30 which is immediately rearward of the dial 30 pocket occupied by the container at position C3. In short, (a) the dial 20 positions containers in alternate pockets of the dial 30, and dial 30 moves these containers to positions where they are engaged by alternate pockets of dial 31, while (b) dial 21 is delivering containers for engagement by the other pockets of the dials 31 and 30.

The pockets of the dials 30 and 31 move in registry and are so designed that containers moving therewith will have their vertical axes spaced in accordance with the spacing between the axes of containers on the platforms 15 of filling table 16 and that maintained by dial 14. In order to insure that the containers on conveyor 13 will be held uniformly spaced to this same extent, particularly during high speed operation, a feed screw 40 extends along one side of conveying element 13, a stationary guide plate 41 extending along the other side.

The feed screw 40 is of the same type as the feed screws 22 and 23 except that its helical groove is of uniform pitch throughout its length and the device ordinarily may be of substantially greater length than the feed screws 22 and 23.

If the mechanism is to be used to handle a run of containers of a different size than that indicated in the drawings, the various fixed guides and the feed screws 22, 23 and 40 must be moved either toward or away from the longitudinal center lines of their respective straight line conveyors. Also, it will be necessary to remove the dials 20, 21, 30, 31 and 14 and replace them with dials having pockets of the proper size.

It will be understood that the conveying elements 10 and 11 may be driven from a common shaft but, in any event, these elements will be driven in properly timed relation to the other elements of the mechanism and the filling table 16.

The operation of the mechanism described above is as follows: In the operation of a bottle washer, a line of containers, for example, twelve bottles, may be simultaneously placed upon each of two straight-line conveying elements respectively positioned to the left of the conveyor elements 10 and 11. In Figure 1 the outfeed end of such a conveyor appears at 65. As soon as the line of twelve bottles has been moved clear of the washer by a conveyor element such as 65, another line of a like number of bottles will be placed upon conveying element 65.

If bottles are being handled, the conveyors such as 65 generally will be operated at a speed of the order of 600 inches per minute which is sufficiently slow that the bottles will not fall over when they are placed upon the conveyor 65 by the washer. As is hereinafter described, the conveying elements 10 and 11 are operated at higher speed than the washer outfeed conveying elements 65. However, even tall bottles such as export beer bottles can be smoothly transferred to the conveying elements 10 and 11 by a fixed deflector such as 66 shown positioned at the outfeed end of 65 and the infeed portion of the conveying element 10 to deflect the containers from the relatively slow conveying element 65 to the faster conveying element 10.

The washer, the two conveying elements such as 65 and the corresponding conveying element associated with the conveying element 11 are generally operated at such speed as to maintain a line of contacting containers immediately adjacent the infeed ends of the feed screws 22 and 23 so that an adequate supply of containers for the filling machine will be assured.

The feed screws 22 and 23, dials 20, 21, 30 and 31 and the feed screw 40 are operatively connected by suitable gearing so that all of these elements will operate in synchronism at the relative speeds discussed below. All of the elements just mentioned preferably will be geared to the drive for the filling table 16 and dial 14 though speed changing arrangements may be interposed to permit independent adjustment of the speed of travel of the conveying elements 10 and 11 and also independent adjustment of the feed screws 22 and 23 with respect to the remainder of the elements. As is described in said Day and Breeback application, the feed screws 22 and 23 will be driven by gearing connected to their right-hand ends. The feed screw 40 also will be driven by gearing connected to its right-hand end.

Referring now to the relative speed of the elements shown in Figure 1, if the filling table 16 is operating to handle containers at a linear speed of 1200 inches per minute with the container axes spaced three inches apart, the conveying element 13 and feed screw 40, as well as the dials 20, 21, 30 and 31 will operate at that same linear speed. Under these conditions, feed screw 40 will maintain the containers spaced on three inch centers and the pockets of the dials 30 and 31 will maintain containers on three inch centers but the pockets of the dials 20 and 21 will move containers on six inch centers.

Because the dials 20 and 21 are moving at linear speeds of 1200 inches per minute and handle containers spaced on six inch centers, it will be necessary for the conveying elements 10 and 11 and feed screws 22 and 23 to deliver containers to the dials 20 and 21 spaced on six inch centers and moving at linear speeds of the order of 1200 inches per minute. This requirement can be met by operating the conveying elements 10 and 11 at linear speeds of 1200 inches per minute and rotating the feed screws 22 and 23 at such speed that their left-hand or infeed ends will advance containers at linear speeds of the order of 500 inches per minute, that is, approximately the speed of the conveying element 65 and the corresponding conveying element which delivers bottles to conveying element 11. By this procedure, bottles may accumulate at the infeed ends of the feed screws if, in accordance with usual practice, the output of the washer is slightly greater than the demand of the succeeding device or machine, in this case, the feed screw.

Because the container engaging helical groove of each of the feed screws 22 and 23 is of increasing pitch toward its outfeed end as described in said Day and Breeback application, when the infeed end of one of the feed screws is rotating to advance containers at a speed of the order of 500 inches per minute, the outfeed end of the feed screw will permit containers to move at a linear speed of the order of 1100 inches per minute. In other words, although the conveying element 10, for example, will be moving at 1200 inches per minute, it will merely slide beneath any containers standing adjacent the infeed end of the feed screw 22 and when a container is removed from this group by the infeed end of feed screw 22, the container then will move at the linear speed permitted by the infeed end of the screw 22, namely, 500 inches per minute. While the container moves along with the screw, the linear speed of the container will progressively accelerate due to the pulling action of conveying element 10 and the permissive effect of the progressively increasing pitch of the feed screw 22.

At the instant that the container becomes completely free of the groove of feed screw 22, the container then will be free to move with and at the speed of conveying element 10. At this instant, a pocket of the dial 20 will be advancing along its arcuate path toward the container under discussion. It will be noted from Figure 1 that rearwardly of each pocket of the dials 20 and 21, the dial perimeter progressively curves toward the dial axis as indicated at 62. Therefore, when a container is free of the outfeed end of feed screw 22, the container will be free to move at the same linear speed as the conveying element 10 except as restricted by the portion 62 of the dial perimeter immediately in advance of the dial pocket which is to receive the container. Because the portion 62 progressively approaches the dial axis, the free container may advance somewhat with conveying element 10 but it probably will not achieve a speed of 1200 inches per minute until it actually is engaged by a dial pocket in the manner indicated by the container at position C4 in Figure 1. Once a container has been fully engaged by a dial 20 or 21, its linear speed will continue constant at the rate required by the filling machine. Moreover, it will be observed that once the containers move out of contact with each other at the infeed end of the feed screws 22 and 23, they will remain spaced apart so that marring of the containers will be entirely avoided.

It will be noted from Figure 1 that the spacing between the pockets of the dials 20 and 21 is greater than that imparted by the threads of the outfeed end of the feed screws 22 and 23. However, with conveying elements 10 and 11 moving at a faster linear speed than that imparted to containers by the feed screws, a container released by a feed screw immediately will become spaced from the following container and when a dial pocket fully engages the outfeed container, this spacing will increase.

It will be noted from the above that although the output of the washers or rinsing devices may be only 200 containers per minute and feed screws 22 and 23 and conveying elements 10 and 11 may handle containers at that rate, nevertheless, the outfeed of the dials 30 and 31 can be 400 containers per minute and containers fed from 30 and 31 will be travelling at a linear speed which is twice that of the conveying element 65 and the corresponding conveying element which delivers containers to the conveying element 11.

It will be understood that the feed screws 22 and 23 may be designed to accept containers at a linear speed more closely approaching that of the conveying elements 10 and 11, for example, at 900 inches per minute if elements 10 and 11 are moving at 1200 inches per minute. Also, the outfeed linear speed of the screws may more closely approximate the linear speed of 10 and 11. However, if the containers moving from a feed screw such as 22 are to be spaced on centers as far apart as six inches, it appears desirable to free the containers from the feed screws at a speed slightly less than the speed of the conveying elements 10 and 11, and thereby provide a time interval during which a pocket of the dials 20 and 21 may move into engagement with the container.

Because feed screw 40 is of uniform pitch throughout its length and operates in timed relation to the infeed dial 14 forming part of the filler, the containers will move from screw 40 in exact synchronism with the pockets of dial 14. The usual fixed guide plate 70 is secured adjacent dial 14, plate 70 including a guiding edge 71 concentric with the dial axis and adapted to engage the body portions of containers to hold them securely in the dial pockets.

In order to further insure that the containers will be held steady and against vibration or upsetting during at least the latter portion of their travel with dial 14 and also during transfer from dial 14 to the container supporting platforms 15 of the rotary filling table, the invention provides the arrangement described below. As best shown in the upper right-hand portion of Figure 1, a guide rod 72 is secured to a vertical post 73 extending upwardly from the stationary table 17 of the filling machine. As best shown in Figure 2, guide rod 72 lies in a horizontal plane at such height that it will engage a container closely adjacent the container mouth. For example, Figure 2 shows rod 72 positioned to handle export beer bottles, and in such case, rod 72 will contact the bottles immediately below the mouth enlargement.

The portion 74 of rod 72 adjacent its free end 75 is curved to be concentric with the axis of dial 14 and on such a radius that containers moving in the dial pockets will be engaged by the rod at the height mentioned above. However, the infeed end 75 of rod 72 is bent to curve slightly closer to the dial axis to thereby provide a lead-in portion upon the rod.

The portion 74 of rod 72 which is concentric with the axis of dial 14 terminates at the imaginary line extending between the axis of dial 14 and the axis of the filling table 16 and, as shown in Figure 1, to the left of that point, rod 72 includes a portion 76 concentric with the axis of the filling table 16. Portion 76 is only of sufficient length to be engaged by containers on platforms 15 which are in their lowermost position, usually flush with the surface of the stationary table 17 of the filling machine as indicated in Figure 2.

Each of the filling platforms 15 is provided with a container holder 80 which is about three inches high and of arcuate form to provide a slightly less than semicylindrical and vertically extending surface to engage at least the lower portion of the body of the container. If cans including a lower seam flange are to be handled, the container holder 80 would be recessed at its lower edge to receive the can seam. Each holder 80 is secured to its platform 15 by means of set screws 81 extending through slots in the base flange of the holder, the slots extending radially of the filling table.

Each platform 15 also will be fitted with two vertical rods 82 inwardly of the holder 80, each rod secured in an aperture 83 at the inner edge of the platform by a set screw 84. The upper end of each rod 82 is threaded as indicated at 85 and a container engaging plate 86 is supported at the upper ends of the pair of rods. The plate 86 is shown in plan in Figure 4 and includes slots 87 adjacent its inner edge adapted to fit the rods 82, the plate being clamped in adjusted position on the rods by means of opposed nuts 88. The slots 87 also will extend radially of the filling table.

The outer edge of each plate 86 is provided with a V-shaped notch 89, the inner and central portion of which is formed on a radius corresponding to the outside radius of the neck portion of a container. For example, if the plate 86 is to handle export beer bottles, the portion 90 of the plate 86 will be curved on a radius corresponding to the outside radius of the neck of such a bottle at the point immediately below the neck reinforcing shoulder. Because this surface of export bottles is slightly tapered to reduce upwardly, the portion 90 of notch 89 also would be similarly tapered as indicated by the dotted line 91 of Figure 4.

It will be noted from Figure 2 that when a platform 15 is in its lowermost position, the container engaging plate 86 of a platform 15 will lie in substantially the same plane as the container guiding rod 72. Therefore, so long as a container is on a platform at that position, its neck and mouth portion will be engaged between the rod 72 and the plate 86. At the same time, the base portion of the container will be engaged by the container holder 80. All of this usually will counteract the tendency to vibrate of even an export bottle having its base chipped.

Figure 3 illustrates the lower portion of a filling head 95 such as may be used to fill export bottles on a filling machine equipped with the platform and container holding and guiding arrangements described above. The lower portion of filling head 95 includes an adapter collar 96 secured to the body 97 of the filling head by the usual nut 98. Adapter 96 includes a central vertical bore in which the beer tube 99 of nozzle 100 is threaded. A vent tube 101 inclines downwardly through adapter 96 and opens to the interior of the outer sleeve 102 of nozzle 100.

The exterior of the nozzle liquid tube 99 is reduced in diameter as indicated at 103 from a point opposite the lower end of passage 101 to ports 104 in the outer tube 102. By this arrangement, as a container is filled, gas and air therein may escape through the ports 104 and space 103 to move upwardly through the passage 101 to the reservoir. A separate passage, not shown, may open through adapter 98 to the space 103 for counterpressure flow. A container mouth sealing gasket 105 is positioned in the adapter 96 with its lower surface closely above the ports 104. It will be noted that no centering bell slidable on nozzle 100 need be provided when the bottle holding arrangements of Figure 2 are provided. Therefore, the nozzle 100 may be of maximum and uniform outside diameter down to its lower end. For example, with a bottle having a mouth bore of five-eighths of an inch, the outside diameter of nozzle 100 may be at least one-half an inch. Also, its lower end may be rounded to center containers.

The operation of the bottle guiding rod 72, platform structure and filling nozzle of Figures 2 and 3 is as follows: While a container is moving with the filler infeed dial 14, or at least during the portion of its movement with that dial wherein the container moves from stationary table 17 to a platform 15, the container will be engaged not only by dial 14 and guide plate 70 but also by guide rod 72. Because guide rod 72 will engage the container adjacent its mouth, vibration of the container will be minimized. At the instant that the container is firmly positioned against the container holder 80 on a platform 15, the upper portion of the container likewise will engage the inner portion 90 of the notch 89 of plate 86 and the mouth portion of the container still will be in contact with the guide rod 72. This position of the container with respect to the guide rod is indicated by the platform at position 15a of Figure 1.

As the rotation of the filling table 16 continues, the container will move clear of the infeed dial 14 but still will be engaged by the platform structure of Figure 2 and the guide rod 72. At the point in the rotation of table 16 where the platform 15 will begin to rise, slightly to the right of the position indicated by the platform 15b of Figure 1, the guide rod 72 extends sharply outwardly from the filling table 16 to thereby be clear of the rising movement of the container.

As is illustrated in Figure 2, the nozzle 100 of the filling head 95 has its lower end only about a quarter-inch above the mouth of the container when the platform 15 is in lowered position. In order that the containers will be positively centered with respect to the nozzle 100 as soon as possible after the container moves clear of the guide rod 72, the filling machine will be provided with a platform controlling cam arrangement such as disclosed in application Serial No. 260,968 of Carl L. Day and Rudolph H. Breeback, filed December 11, 1951, for Filling Machines, now Patent No. 2,699,282. The point to which the initially-acting steep cam of that application will lift the container is indicated in dotted lines at 100a in Figure 2 and this lift may be about one inch. With the mouth of the container in this raised position with respect to nozzle 100, it will be impossible for the container to fall over or vibrate to any substantial extent even during high speed travel. As is also disclosed in said last-mentioned application, the platform then will be raised at a slightly lower rate to bring the mouth of the container into engagement with the sealing gasket 105 of the filling head.

It will be understood that if the containers to be handled are of less height than the export bottle illustrated in Figure 2, the guide rod 72 would be lowered and the mouth plate 86 would be correspondingly lowered to thereby engage the container immediately below its mouth.

It will be noted that because the container feeding mechanism of Figure 1 operates in synchronism with dial 14 and the rotary filling table 16, the containers supplied by one of the conveyor means such as 10 or 11 always will be positioned upon the same platforms 15 of a rotary filling table 16. For example, assuming that the rotary filling table 16 includes sixty filling heads and platforms, if the containers received from screw 22 and dial 20 are placed upon the even numbered platforms, those moving from the feed screw 23 and dial 21 will be placed upon the odd numbered platforms. This arrangement is particularly efficient with beer filling machines because if a charge of beer stands in a filling head for a few minutes, that charge becomes slightly warm and therefore is apt to foam in the first container which is filled when filling is resumed. By the arrangement described above, if feed of containers on the conveying element 10 is interrupted, the feed of containers on the conveyor 11, feed screw 23 and dial 21 may continue and, moreover, the same filling heads will be kept constantly in operation. When the feed of containers by the conveyor 10, feed screw 22 and dial 20 resumes, the first round of incoming containers all will be placed beneath the filling heads which are apt to produce a foaming fill and the operator need only concern himself with the containers moving from those platforms.

It will be perceived that the mechanisms described above fulfill the stated objects of the invention and will enable containers or other articles to be combined to move at an increase over their initial speed, with a minimum possibility of the containers or other articles becoming upset, jammed or damaged.

Referring to the Figure 1 arrangement, and particularly when used to move containers in the direction of the arrows A, although the use of the helical screw devices 22 and 23 result in quieter and smoother spacing of containers, nevertheless, if desired, the devices 22 and 23 may be eliminated and the line of containers on each of the conveyors 10 and 11 can be successively removed and spaced apart by the dials 20 and 21. In order to avoid jamming of containers under such circumstances, the conveyors 10 and 11 would move along lines closer to the axes of the dials 20 and 21 but parallel to their travel indicated in Figure 1. In other words, the dials 20 and 21 would "cut-off" containers from the conveyors 10 and 11 and move each container through an arc of between 90° and 180° before the container engages the dial 30 or 31. With such arrangement, it will be clear that the dials 20 and 21 will be container-spacing control devices.

The terminology used in the specification is for the purpose of description and not of limitation, the scope of the invention being defined in the claims.

I claim:

1. In combination, a rotary filling table including a plurality of filling heads and container supporting means beneath the filling heads, separate sources for supply of containers, means to deliver containers from said separate sources of supply to the container supporting means for filling, said last-mentioned means including means to positively engage and sequentially combine containers in a single line of spaced containers in such relation with the travel of said filling heads that containers from one of said separate sources of supply are delivered to one series of platforms during one revolution of the filling table and the containers from another of said sources of supply are delivered to another series of predetermined platforms during said revolution of the filling table.

2. In combination, a rotary filling table including an even number of filling heads and container supporting means beneath each filling head, separate sources of supply for containers, means to deliver containers from said separate sources of supply to the container supporting means for filling, said last-mentioned means including means to positively engage and sequentially combine containers in a single line of spaced containers in such relation with the travel of said filling table that containers in said single line from one of said separate sources of supply are delivered to alternate platforms during one revolution of the filling table and containers in said single line from the other of said sources of supply are delivered to the remaining platforms during that revolution of the filling table.

3. In combination, a filling machine including a base, a rotary table journalled on said base and provided with vertically reciprocable container supporting platforms and a plurality of filling heads respectively aligned with said platforms, each of said platforms including means facing radially outwardly of said rotary table to engage the lower portion of a container and similarly facing means to engage the neck portion of a container, orbitally movable means to position containers on said platforms, container engaging members including a portion concentric with a portion of the path of travel of said orbitally movable means and another portion concentric with the path of travel of said platforms and fixed to and extending above said base to engage the opposite side of a container while the latter is successively moving with said orbitally movable means and one of said platforms.

4. A combination of the character described in claim 3 wherein said means to engage the lower portion of a container is of arcuate form and the means to engage the neck portion of the container includes a V-shaped container engaging recess.

5. A combination of the character described in claim 3 wherein said means to engage the neck portion of the container comprises a horizontally arranged plate and a vertically arranged rod secured to and extending upwardly from the container supporting platform, and means to adjustably secure said plate to said rod.

6. A method of feeding containers to and positioning containers on platforms of a rotary filling machine and then filling the containers with a carbonated liquid comprising utilizing separate sources of supply of containers, combining the containers from the separate sources of supply by positively engaging and spacing apart the containers in a single line, and removing alternate containers from the single line and placing them upon alternate platforms of the filling machine and placing the remaining containers of the single line on the remaining platforms of the filling machine.

7. A method of feeding containers to and positioning containers on platforms of a rotary machine and then filling the containers with a carbonated liquid comprising utilizing separate sources of supply of containers, transferring containers from the separate sources of supply in lines to a combining point; positively engaging and sequentially combining the containers from the lines of containers into a single line of spaced apart containers, rotating the filling machine in relation to the combining of the lines of containers into a single line of containers, transferring the containers from the single line of containers onto platforms of the rotating filling machine in the same sequence as the containers are combined so that containers from one of the sources of supply will be fed to a first series of platforms during one revolution of the filling machine while containers from the other source of supply will be fed to a second different series of platforms during the same revolution of the filling machine.

References Cited in the file of this patent

UNITED STATES PATENTS

| | | |
|---|---|---|
| 956,286 | Champ | Apr. 26, 1910 |
| 2,108,522 | Bergmann | Feb. 15, 1938 |
| 2,122,769 | Bergmann | July 5, 1938 |
| 2,145,765 | Huntley et al. | Jan. 31, 1939 |
| 2,187,332 | Sinz | Jan. 16, 1940 |
| 2,202,033 | Stewart et al. | May 28, 1940 |
| 2,371,419 | Bergmann | Mar. 13, 1945 |
| 2,535,859 | McPherson | Dec. 26, 1950 |